June 18, 1940.                R. R. MAYO                2,204,764
THERMOMETER ATTACHMENT FOR FOUNTAIN SYRINGE BAGS OR SIMILAR CONTAINERS
                        Filed June 10, 1939
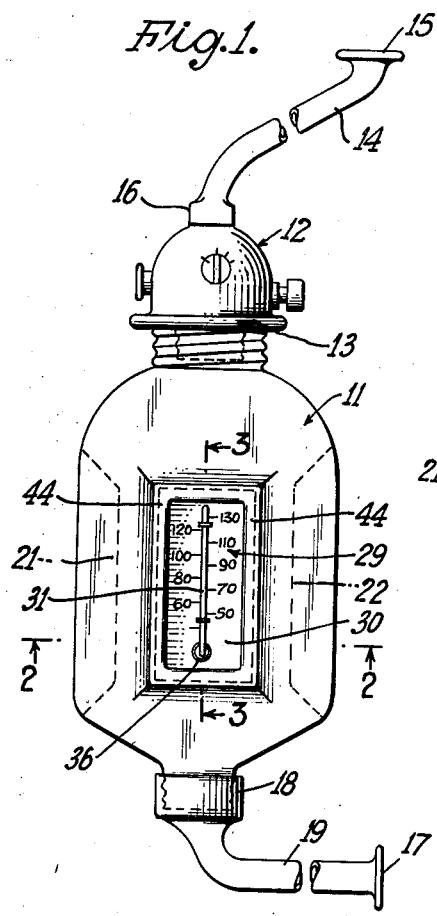
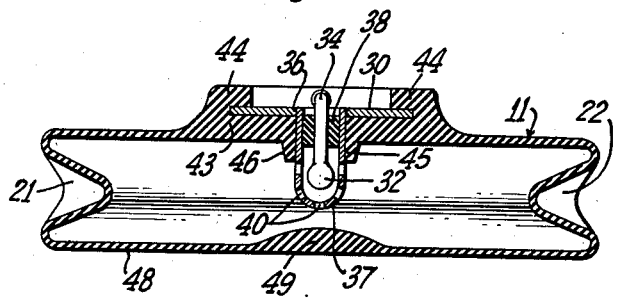
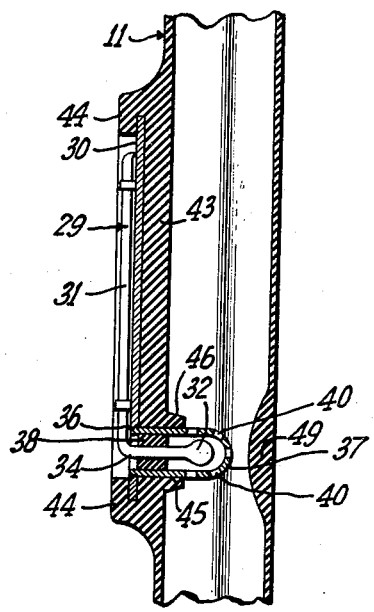
INVENTOR
Rutledge R. MAYO
BY
ATTORNEY Patented June 18, 1940

2,204,764

UNITED STATES PATENT OFFICE 2,204,764

THERMOMETER ATTACHMENT FOR FOUNTAIN SYRINGE BAGS OR SIMILAR CONTAINERS

Rutledge R. Mayo, New York, N. Y., assignor of one-half to Albert L. Stover, Bradford, Pa.

Application June 10, 1939, Serial No. 278,487

4 Claims. (Cl. 73—343)

This is a refile in part of my application Ser. No. 201,281 filed on April 11, 1938.

This invention refers to a thermometer attachment for a fountain syringe bag or similar containers.

It is an object of my invention to broaden the field of application of such fountain syringes for medical, hygienic, cosmetic, or other treatment of the body. A fountain syringe provided with the thermometer and thermometer attachment forming the object of this invention is valuable in syringes for continuous passage of an irrigation liquid, which liquid may be fed from the cold and/or warm water supply faucet or faucets, or from any reservoir, or tank, or other receptacle and which liquid may then be used for exterior or interior irrigation purposes in order to direct to some part of the body a steady and regulated flow of any convenient temperature.

It is an object of this invention to arrange the thermometer at the container or bag of a fountain syringe so that it is protected against any damage in ordinary use and even to some extent against rough handling. Simultaneously, the thermometer may be taken off the bag or container and replaced easily. Moreover, the thermometer is placed at the bag or container at such a place that the thermometer bulb reaches the liquid contained in the bag or flowing through the bag at a medium point so that exact temperature may be taken instantaneously. The user of the syringe, be it for irrigation of a definite quantity of liquid or for continuous irrigation, may thus control and regulate easily the liquid to be applied.

Other objects of the invention may be seen from the following description and the appertaining drawing.

In the drawing affixed hereto and forming part of the specification, the invention is illustrated by way of example. It will be readily understood, however, that my invention is not limited to this example and that other embodiments of my invention are feasible without departing from the spirit and the ambit of my appended claims.

In the drawing:

Fig. 1 is a front view of a fountain syringe for continuous passage of an irrigation liquid provided with a thermometer according to this invention, Fig. 2 is a cross section of the liquid container along line 2—2 of Fig. 1, on an enlarged scale, Fig. 3 is a longitudinal section along line 3—3 likewise on an enlarged scale.

11 designates a liquid container or bag which may be made of any convenient material, preferably of flexible or of elastically expansible material, such as rubber, or cloth rendered impermeable by an appropriate impregnation or coating or both. A head piece 12 is detachably mounted at the mouth 13 of the container or bag or may be of one piece with them. 14 is a feed tube which with its one end is detachably mounted at the feed end 16 of the head piece or control head 12 whereas the other end 15 may be applied to any source of liquid, for instance the cold and/or warm water supply faucet or faucets, or to any reservoir, tank, or other receptacle. A delivery tube 19 is attached to the lower end 18 of the liquid container or bag and may be provided at its end 17 with any nozzle, douche, or the like, as known for medical, hygienic, cosmetic, or other purposes.

If the container or bag is made of flexible material, as aforestated, it will expand or collapse and thus vary its volume ever according to the pressure or quantity of liquid passing through the fountain syringe and will thus tend to equalize the pressure, velocity, and quantity of the liquid output thus steadying the irrigation flow over a considerable period.

The expanding and collapsing effect may be increased by providing the container or bag with bellow-like folds as shown at 21 and 22, (Figs. 1 and 2).

For other details of the syringe, its head piece and the mode of its operation, reference is made to my copending application Ser. No. 278,488 filed June 10, 1939.

In order to ascertain the temperature of the liquid, the container or bag is provided with a thermometer 29, as shown in Fig. 1 in front view, in Fig. 2 in section, and in Fig. 3 in longitudinal section, respectively.

In accordance with this invention, at the place where the thermometer is to be mounted on the bag, wall section 43 of the bag wall 11 is reenforced and raised thus forming a plate-like base for the thermometer.

A frame 44 is formed by and protrudes from the bag wall and surrounds and overlaps the edges of the plate-like reenforced wall section forming the thermometer base; both, thermometer base 43 and frame 44 forming a socket on the bag wall, which supports and embraces the thermometer 29 by means of its plate 30 inserted into this socket.

The thermometer tube 31 is angularly bent to the rear at 34, and the bent part 34 together with the thermometer bulb 32 is covered by a rearward presented cap 37, mounted to the sidewall of a bore 36 of the thermometer plate 30. Tube part 34 is packed within the cap 37 by means of a short rubber tubing 38, which may be cemented to the cap and/or to the tube end. The packing may consist also of cork washers or washers of any other suitable material. Cap 37 is perforated towards the rear, at 40.

The thermometer thus forms a highly resistant unity which may be handled safely, mounted and dismounted, if necessary, without any risk of damage, even if roughly treated.

At the place of the thermometer cap or bulb, respectively, the base 43 is provided with an opening 45, the edge of which is elongated, to the interior of the bag, and forms a collar 46, which constitutes a tight seat for the thermometer cap and together with the packing within the cap seals the liquid within the bag or container against escaping through and at the side of the cap.

In order to render the thermometer more shockproof and to secure the rear wall of the container or bag against wear, the rear wall 48 of the syringe bag may be provided with an inward presented reenforcement or boss 49 in juxtaposition to the thermometer bulb or cap, respectively, against which reenforcement or boss, when the bag is empty, the cap may bear.

The thermometer plate 30 may be cemented to its socket plate 43, by means of rubber cement, for instance.

By providing at the bag or container a socket into which the thermometer is inserted, the thermometer is safely attached to the bag or container without any risk that the thermometer might become loose when a soft and pliable bag is handled and that it be damaged when, by inadvertence or negligence the bag is hit or dropped.

I claim:

1. A thermometer attachment for a fountain syringe bag, or similar container, including, as a thermometer base, a plate-like reenforced wall section comprising a wall portion of said bag and protruding therefrom a frame integral with said thermometer base and surrounding and overlapping the edges of said thermometer base, said thermometer base and said frame forming a thermometer socket on said bag wall adapted to support and to embrace a thermometer by means of a thermometer plate.

2. A thermometer attachment for a fountain syringe bag or similar container including a thermometer tube, a thermometer bulb, and a thermometer plate, a plate-like reenforced wall section of said bag as a thermometer base and frame integral with said thermometer base and protruding therefrom, and surrounding and overlapping the edges of said thermometer base, said thermometer base and said frame forming a thermometer socket on said bag wall adapted to house said thermometer plate, said thermometer bulb being angularly bent from said thermometer tube, a bore within said plate, a cap mounted at the edge of said bore and rearward projecting therefrom and adapted to house said angularly bent thermometer bulb, means for packing said bulb within said cap, said cap being perforated towards the rear, a bore within said thermometer base adapted to give passage to said cap.

3. A thermometer attachment as set forth in claim 2, said thermometer base having a rearward presented collar on said bore, said collar being adapted to embrace and seal tightly the base section of said cap.

4. A thermometer attachment as set forth in claim 2, the rear wall of said bag having an inward presented boss of reenforced wall material in juxtaposition to said bore within said thermometer base and said cap, respectively.

RUTLEDGE R. MAYO.